(12) United States Patent
Friend et al.

(10) Patent No.: US 6,283,138 B1
(45) Date of Patent: Sep. 4, 2001

(54) PRESSURE RELIEF VALVE MONITORING DEVICE

(75) Inventors: Ronald George Friend, Franklin, MA (US); Michael Allen Jones, Bristol, RI (US)

(73) Assignee: Anderson, Greenwood LP, Wrentham, MA (US)

(*) Notice: Subject to any disclaimer, the term of this patent is extended or adjusted under 35 U.S.C. 154(b) by 0 days.

(21) Appl. No.: 09/285,268

(22) Filed: Apr. 2, 1999

Related U.S. Application Data

(60) Provisional application No. 60/083,021, filed on Apr. 24, 1998.

(51) Int. Cl.[7] .................................................. F16K 37/00
(52) U.S. Cl. .................. 137/14; 137/552; 137/552.7; 137/554; 137/469; 137/476
(58) Field of Search ..................................... 137/554, 552, 137/552.7, 469, 476, 14

(56) References Cited

U.S. PATENT DOCUMENTS

| | | | |
|---|---|---|---|
| 2,813,539 | * 11/1957 | Farris | 137/469 |
| 3,113,582 | 12/1963 | Hudson. | |
| 3,369,561 | 2/1968 | Zimmerman et al.. | |
| 3,776,249 | 12/1973 | Wailes et al.. | |
| 4,347,869 | * 9/1982 | Strobel et al. | 137/488 |
| 4,550,747 | 11/1985 | Woodworth et al.. | |
| 4,573,114 | 2/1986 | Ferguson et al.. | |
| 4,694,390 | 9/1987 | Lee. | |

(List continued on next page.)

Primary Examiner—A. Michael Chambers
(74) Attorney, Agent, or Firm—Kenyon & Kenyon

(57) ABSTRACT

A pressure relief valve monitoring device is provided. The monitoring device includes a sensor input module located proximate to a pressure relief valve, a microcontroller located within the sensor input module, and a real time clock/calendar also located within the sensor input module. The monitoring device also includes a number of sensors, including (1) a position sensor mounted on the pressure relief valve for measuring the position of the valve's closure element relative to the inlet nozzle seat and for generating a lift signal representative of such position; (2) a pressure sensor mounted on the pressure relief valve for measuring the pressure of the pressure system and generating a pressure signal representative of such pressure; and (3) a leakage sensor mounted on the pressure relief valve and positioned in close proximity to the inlet nozzle seat and capable of detecting noise generated by leakage of fluid between the inlet nozzle seat and the closure element when the closure element is engaged with the inlet nozzle seat. The microcontroller is configured to receive and store signals from any or all of the three sensors and correlate the receipt thereof with an indication of time from the real time clock/calendar to determine certain characteristics of valve performance. A method for monitoring the operation of the pressure relief valve is also provided.

24 Claims, 5 Drawing Sheets

U.S. PATENT DOCUMENTS

| | | | |
|---|---|---|---|
| 4,775,855 * | 10/1988 | Cox | 340/605 |
| 4,816,987 | 3/1989 | Brooks et al. . | |
| 4,873,817 | 10/1989 | Harns . | |
| 4,879,547 | 11/1989 | Pryslak . | |
| 4,961,441 | 10/1990 | Salter . | |
| 4,972,872 | 11/1990 | Hunt . | |
| 4,976,144 | 12/1990 | Fitzgerald . | |
| 5,175,530 | 12/1992 | Eng . | |
| 5,329,956 * | 7/1994 | Marriott et al. | 137/15 |
| 5,333,642 | 8/1994 | Kemp et al. . | |
| 5,351,548 | 10/1994 | Briggs et al. . | |
| 5,351,705 | 10/1994 | Reinders et al. . | |
| 5,363,874 | 11/1994 | Henszey et al. . | |
| 5,377,529 | 1/1995 | Boyd . | |
| 5,425,270 * | 6/1995 | McDonald et al. | 73/168 |
| 5,431,182 | 7/1995 | Brown . | |
| 5,460,196 | 10/1995 | Yonnet . | |
| 5,464,038 | 11/1995 | Kruto . | |
| 5,504,693 | 4/1996 | Elliott et al. . | |
| 5,538,036 * | 7/1996 | Bergamini et al. | 137/552 |
| 5,549,137 | 8/1996 | Lenz . | |
| 5,558,115 | 9/1996 | Lenz . | |
| 5,573,032 | 11/1996 | Lenz . | |
| 5,660,198 | 8/1997 | McClaran . | |
| 5,669,419 | 9/1997 | Haas . | |
| 5,673,563 | 10/1997 | Albertson et al. . | |
| 5,684,451 | 11/1997 | Seberger et al. . | |
| 5,687,098 | 11/1997 | Grumstrup . | |
| 5,692,537 | 12/1997 | Arlan . | |
| 5,694,117 | 12/1997 | Sugarek . | |
| 5,700,136 | 12/1997 | Sturman . | |
| 5,774,372 | 6/1998 | Berwanger . | |
| 5,803,056 | 9/1998 | Cook et al. . | |
| 5,803,167 | 9/1998 | Bussear et al. . | |
| 5,806,553 | 9/1998 | Sidwell . | |
| 5,813,226 | 9/1998 | Krone et al. . | |
| 5,829,520 | 11/1998 | Johnson . | |

* cited by examiner

VALVE CLOSED

VALVE OPEN

PRESSURE RELIEF VALVE MONITORING DEVICE

This Application claims the benefit of U.S. Provisional Application No. 60/083,021, filed Apr. 24, 1998.

FIELD OF THE INVENTION

The present invention relates to pressure relief devices, and more particularly to devices for monitoring their performance.

BACKGROUND OF THE INVENTION

Pressure lines (e.g., pressure vessels and piping systems) are often designed with pressure relief valves located at various locations to protect the pressure line from excess overpressure. The pressure relief valves are self-actuated devices set to open when the pressure in the pressure line exceeds a specified level. When the pressure in the pressure line exceeds the pressure at which the pressure relief valve is set to open, the closure element of the pressure relief valve moves away from the inlet nozzle seat and fluid is allowed to flow out of the pressure line and through the pressure relief valve. This flow of fluid will continue at a sufficient rate to prevent the pressure in the pressure line from rising above a predetermined level or above a specified overpressure. When the pressure in the pressure line is reduced to a level below the pressure at which the pressure relief valve is set to open, the closure element in the pressure relief valve will return to its closed position, i.e. into contact with the inlet nozzle seat, preventing additional flow from the pressure line. Under normal operating conditions, the closure element of the pressure relief valve is in the closed position.

Prior art monitoring devices used in these pressure lines typically employ position transducers mounted on the pressure relief valve to sense the position of the closure element. These position transducers transmit analog signals indicating the position of the closure element with respect to the inlet nozzle. These devices, however, do not store this information and apply the information to determine operating characteristics of the pressure relief valve, such as total flow through the pressure relief valve during a specified time interval when the pressure relief valve is open.

Moreover, in the prior art the presence of leakage flow past the closure element of a pressure relief valve (i.e., flow past the closure element when the closure element is in the closed position) could only be determined by physically examining the valve in its installed position, removing the valve from its installed position, and performing a seat leakage test on a test stand, or by isolating the valve (through the use of appropriate valving) in its installed position, but not in active service, and performing a seat leakage test in situ. Such techniques for determining the presence of seat leakage, however, do not allow for continuous monitoring to detect seat leakage past the closure element while the pressure relief valve is both installed and in service.

In addition, unstable operation of pressure relief valves, i.e. rapid opening and closing of the closure element, can occur when the system pressure rises just to or slightly above the set pressure and then drops, as a result of fluid flowing from the system through the pressure relief valve, as soon as the closure element lifts off the seat permitting the spring to immediately seat the closure element. Such unstable operation, however, can cause physical damage to components of the pressure relief valve. It is therefore desirable to know when such unstable operation occurs so that corrective action may be taken. The prior art practice has been for personnel to listen for the noise, often referred to as "valve chatter," generated by the closure element being rapidly and repeatedly forced against its seat. This practice, however, is ineffective if no personnel are near the valve at the time the unstable operation occurs or if the location of the valve is beyond earshot of attending personnel.

SUMMARY OF THE INVENTION

In light of the above, a pressure relief valve monitoring device is provided. The monitoring device includes a sensor input module located proximate to a pressure relief valve, a microcontroller located within the sensor input module, and a real time clock/calendar also located within the sensor input module. The monitoring device also includes a number of sensors, including (1) a position sensor mounted on the pressure relief valve for measuring the position of the valve's closure element relative to the inlet nozzle seat and for generating a lift signal representative of such position; (2) a pressure sensor mounted on the pressure relief valve for measuring the pressure of the pressure system and generating a pressure signal representative of such pressure; and (3) a leakage sensor mounted on the pressure relief valve and positioned in close proximity to the inlet nozzle seat and capable of detecting noise generated by leakage of fluid between the inlet nozzle seat and the closure element when the closure element is engaged with the inlet nozzle seat. The microcontroller is configured to receive and store signals from any or all of the three sensors and correlate the receipt thereof with an indication of time from the real time clock/calendar to determine certain characteristics of valve performance. A method for monitoring the operation of the pressure relief valve is also provided.

The present invention provides a monitoring device mounted on or near a pressure relief valve and which will continuously monitor the performance of the pressure relief valve while the valve is in active service. The monitoring device will also convert analog signals received from sensors attached to the valve into digital format, will store the digital information, will detect leakage flow through the pressure relief valve while the valve is in active service, will calculate fluid mass flow through the pressure relief valve when the valve is open and allowing fluid to flow from the pressure line, will detect and warn of unstable operation of the pressure relief valve, and will communicate with a host computer to transmit the information stored by the valve monitoring device and receive information regarding that particular valve from the host computer.

BRIEF DESCRIPTION OF THE DRAWINGS

The foregoing objects and other attributes of this invention, and the attendant advantages thereof, may be more fully understood from the following description when read together with the accompanying drawings in which.

DETAILED DESCRIPTION

Figure 1:
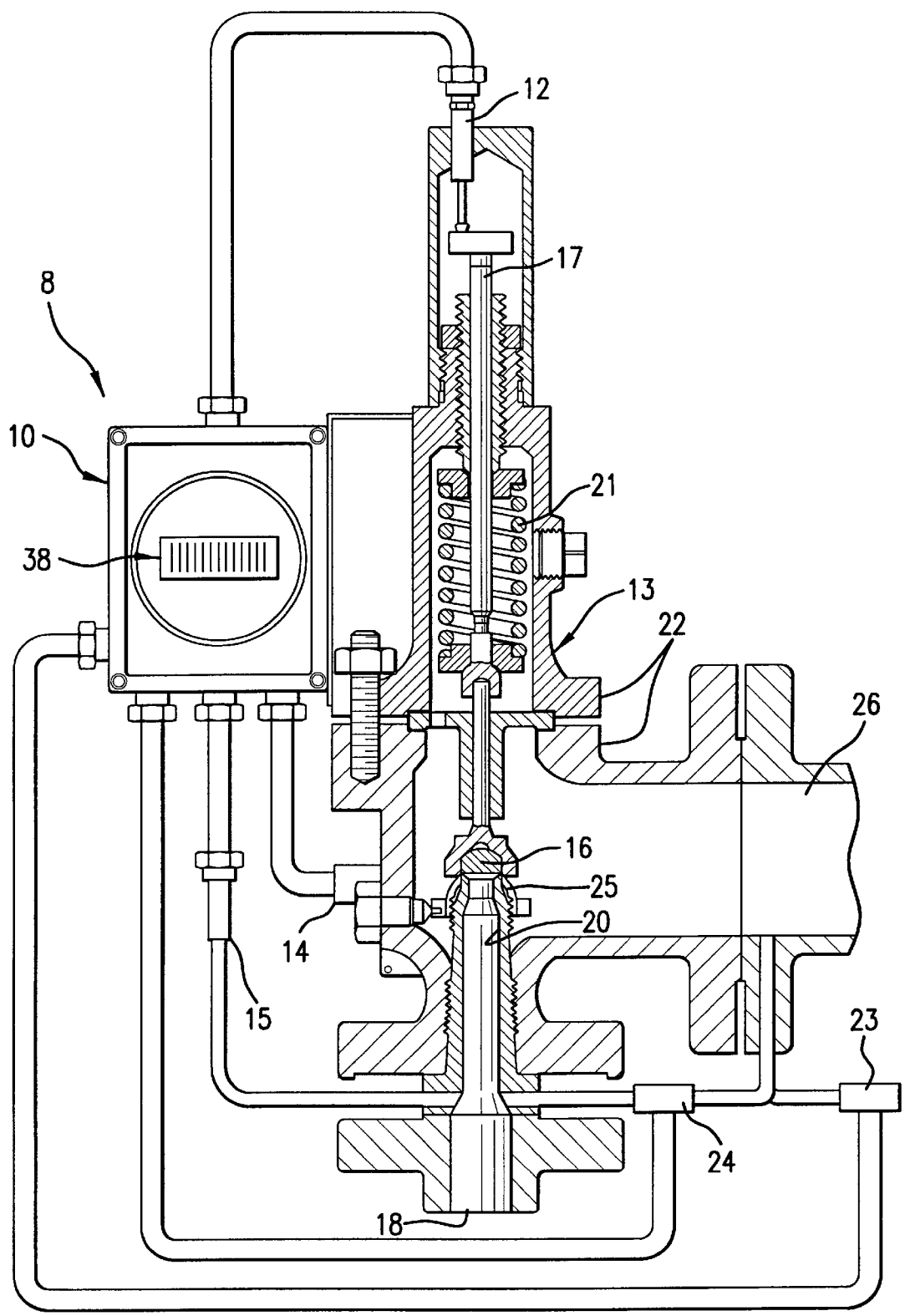
FIG. 1 is a view of a typical pressure relief valve, shown in vertical section, with a valve monitoring device according to the present invention attached thereto.

FIG. 1 shows a preferred embodiment of the pressure relief valve monitoring device, indicated generally at 8, according to the present invention. As shown, this embodiment includes a sensor input module or SIM 10 which is connected to and receives analog signals from a position sensor 12, a leakage sensor 14, and a pressure sensor 15, all mounted on a pressure relief valve 13. The pressure relief valve 13 includes an inlet nozzle 20 with an inlet nozzle seat 25 connected in fluid communication with a pressure system 18, and a closure element 16 which contacts the inlet nozzle seat 25 when the pressure relief valve 13 is closed and which is able to move away from the inlet nozzle seat 25 to allow fluid from the pressure system 18 to flow through the nozzle 20, with a compression spring 21 controlling the position of the closure element 16 by opposing the force of the pressure acting on the closure element 16. A housing 22 supports and contains the aforementioned valve components. A spindle 17 extends through the housing 22 and is held by the spring 21 against, and thus exactly replicates the movement of, the closure element 16.

Figure 1A:
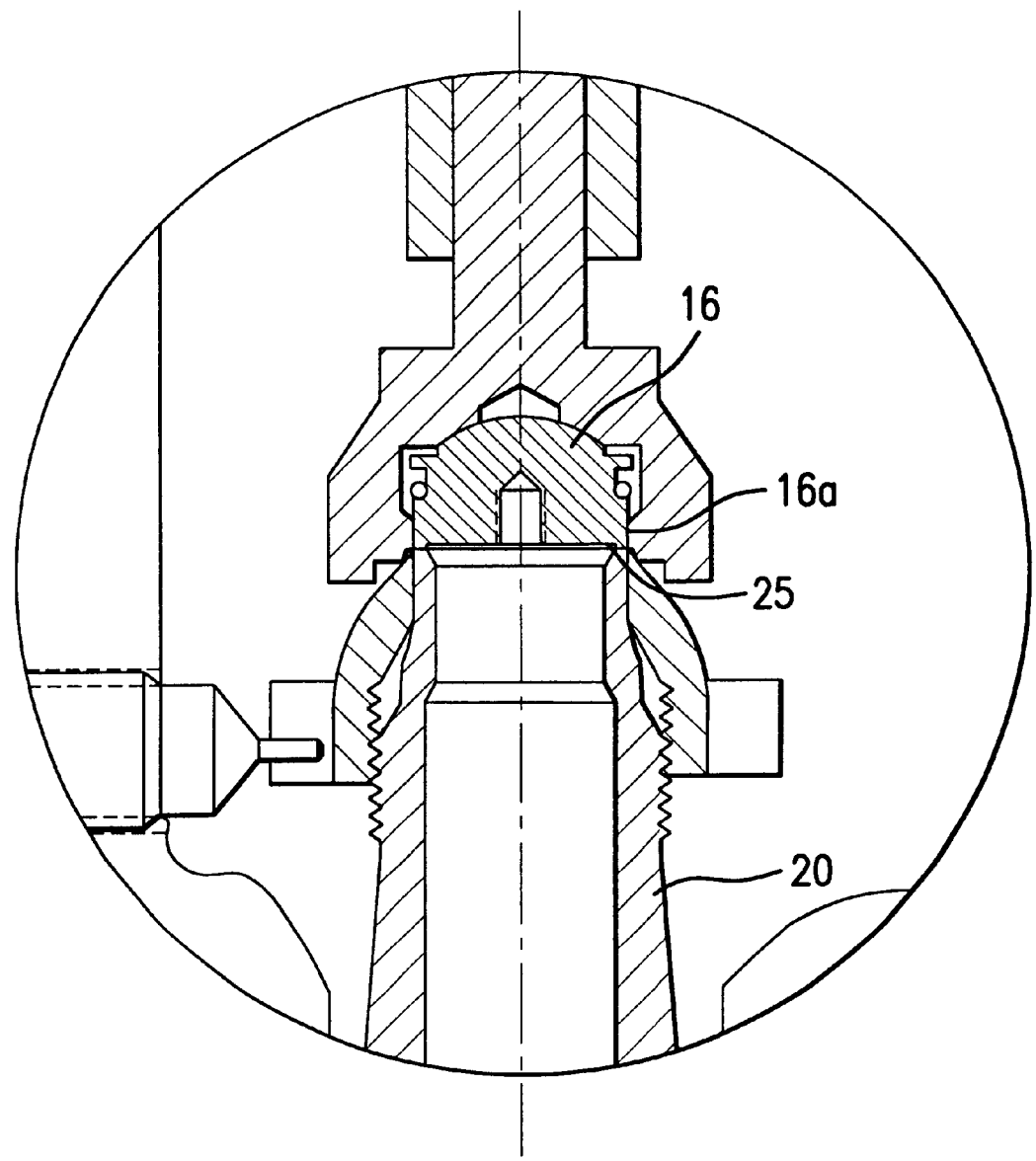
FIG. 1a is an enlarged view of a portion of the pressure relief valve shown in FIG. 1.
Figure 1B:
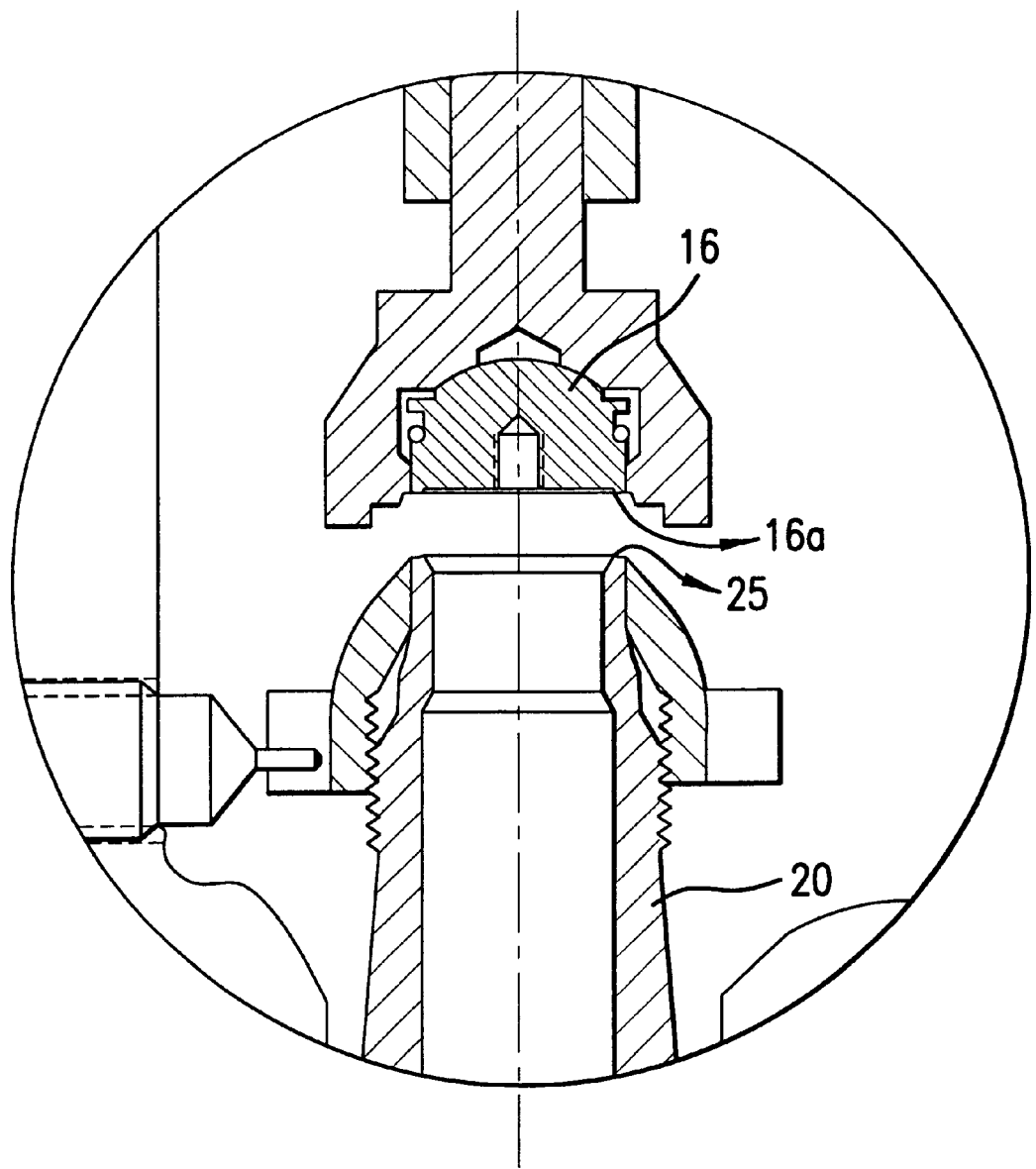
FIG. 1b is a view of the pressure relief valve shown in Fig. 1a showing the valve in an open position.

An enlarged view of the area of the pressure relief valve 13 where the closure element 16 contacts the nozzle seat 25 when the valve 13 is closed is shown in FIG. 1a. With reference to FIG. 1a, the portion of the closure element 16 that comes into contact with the inlet nozzle 20 at the inlet nozzle seat 25 (i.e., the surface of the closure element 16 where contact occurs) may be identified as the closure element seat 16a. Similarly, the portion of the inlet nozzle 20 that comes into contact with the closure element 16 (or, more specifically, with the closure element seat 16a of the closure element 16) may be identified as the inlet nozzle seat 25. Both the closure element seat 16a and the inlet nozzle seat 25 (and their interaction) may be more clearly seen with reference to FIG. 1b, which shows the section of the pressure relief valve 13 shown in FIG. 1a except that in FIG. 1b the valve 13 is open.

Referring again to FIG. 1, the pressure relief valve 13 is designed to protect the pressure system 18 from excess pressure. The spring 21 is pre-compressed and applies a force which holds the closure element 16 in contact with the nozzle seat 25. In this position, the closure element 16 forms a seal with the nozzle seat 25 and thus prevents fluid from the pressure system 18 from flowing through the nozzle 20. Pressure in the pressure system 18 acts upon the closure element 16 creating a force which opposes the spring force. When pressure in the pressure system 18 reaches a predetermined level, i.e. the set pressure of the pressure relief valve 13, the force of the pressure acting on the closure element 16 overcomes the force exerted by the pre-compressed spring 21, thus permitting the closure element 16 to move away from the nozzle seat to allow fluid to flow out of the pressure system 18, through the nozzle 20, past the closure element 16, and out of the pressure relief valve 13. The flow of fluid out of the pressure system 18 prevents pressure in the pressure system 18 from increasing above an allowable level above the set pressure.

A lift or position sensor 12, which preferably is a high impedance variable resistor (or other means of indicating lift) such as a 50k Ohm potentiometer sold by Betatronix, Inc., is in contact with the spindle 17 which moves with the closure element 16. The resistance generated by the position sensor 12 is an indication of the position of the closure element 16. This position information is transmitted to the sensor input module 10. When the closure element 16 moves, the change in resistance of the sensor 12 indicates a change in the position of the closure element 16 and the magnitude of that change, which information is stored in the sensor input module 10 as a function of real time—i.e., the time at which movement of the position sensor 12 occurred, the extent of that movement, and the elapsed time the closure element 16 remained in that position are recorded. The information so recorded, along with corresponding information from the pressure sensor 15, permits a determination of the quantity or mass of fluid that has escaped through the pressure relief valve 13 under critical flow conditions when the fluid is compressible. When the fluid flow through the pressure relief valve is compressible and subcritical, both the inlet and the outlet pressure may be used to determine the total mass flow. When the fluid flow through the pressure relief valve is noncompressible, the differential pressure between the inlet and outlet may be used to determine the total mass flow. The pressure sensor 15, which preferably is a thin film strain gauge such as sold by Strain Measurement Devices, Inc., is connected to the inlet pressure line 18 and provides a signal which is representative of the magnitude of the pressure in the pressure line 18. This pressure signal is transmitted to the sensor input module 10, where it is recorded in relation to real time.

Additional sensors may be provided which measure outlet pressure, differential pressure, fluid or ambient temperature, or other parameters. Information from such additional sensors may also, in a similar manner, be transmitted to and stored in the sensor input module 10.

When the magnitude of the pressure in the inlet pressure line 18 is reduced to a specified level below the opening pressure of the pressure relief valve 13, the force of the spring 21 overcomes the pressure force on the closure element 16 and the closure element 16 moves back into contact with the nozzle seat 25 stopping further flow of fluid from the inlet pressure line 18. When the closure element 16 comes in contact with the nozzle seat 25, movement of the closure element 16 ceases. When this occurs, storage of additional inlet pressure data and closure element position data in the sensor input module 10 may be discontinued.

Under normal operating conditions, the closure element 16 remains in contact with the nozzle seat 25. This is the closed position of the pressure relief valve 13. While there should be no flow past the closure element when the closure element 16 is in its closed position, such "leakage flow" can occur and it is often important to know when it does. A leakage sensor 14, preferably a piezo electric crystal, such as that sold by Massa Products Corp., is attached to the housing 22 of the pressure relief valve 13 and protrudes through the housing 22 in close proximity to the interface between the inlet nozzle seat 25 and the closure element 16. When the closure element 16 is not in perfect sealing engagement with the nozzle seat 25, or when either the closure element seat 16a or the inlet nozzle seat 25 is damaged, or when solid particles are present on the nozzle seat 25 or on the closure element seat 16a, there may be leakage flow between the closure element seat 16a and the inlet nozzle seat 25. Such leakage creates a noise having a characteristic frequency, which frequency is a function of the fluid within the system. The leakage sensor 14 is capable of detecting noises in this range of frequencies and, upon detection, sends a signal to the sensor input module 10 indicating the presence of leakage flow. This signal, as a function of time, is stored in the sensor input module 10. This signal may also be transmitted from the sensor input module 10 to an enunciating device or to a process controller to activate an alarm indicating the presence of leakage flow in the pressure relief valve 13 in installations where the device is connected to such a network.

Figure 3:
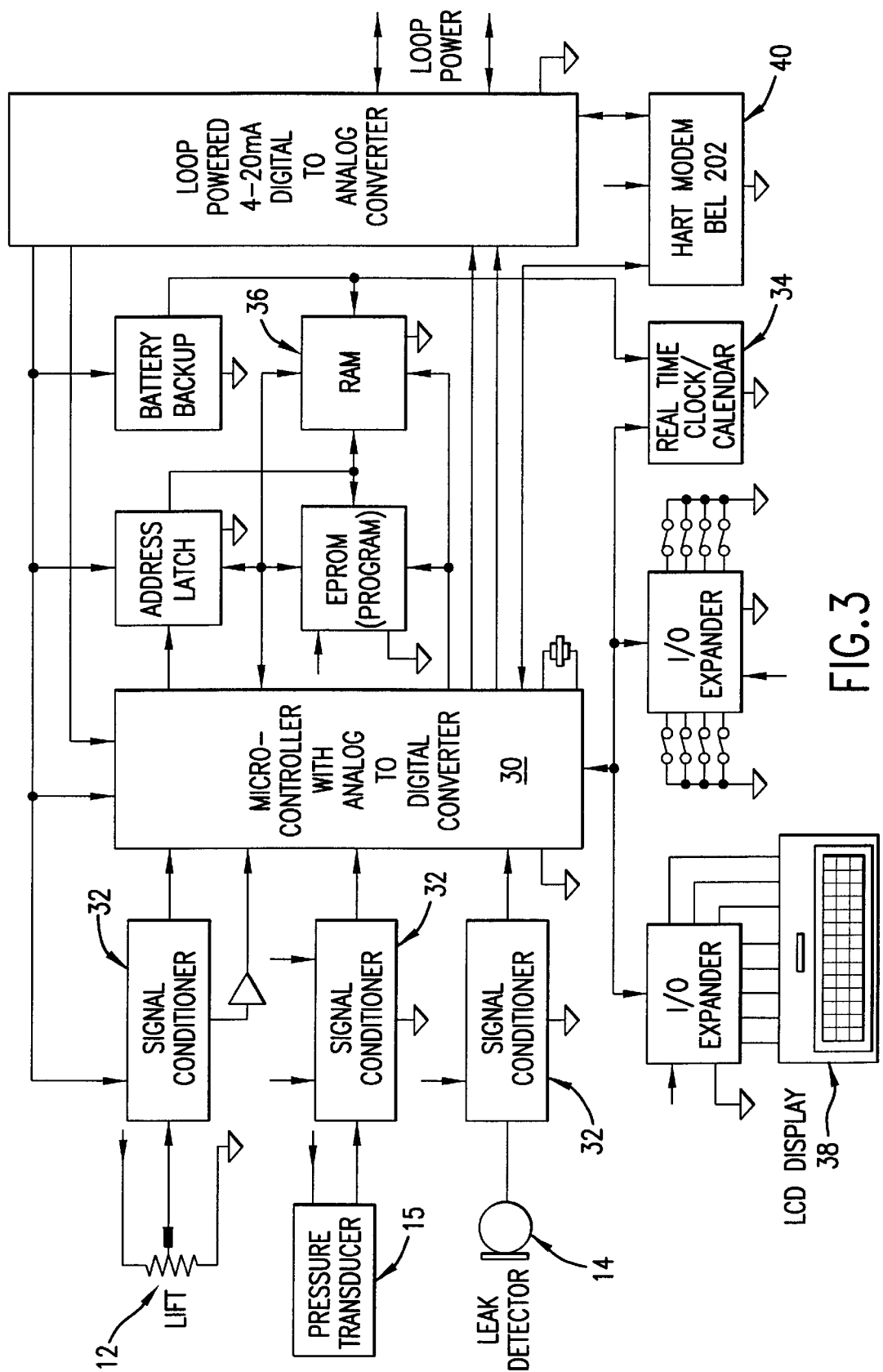
FIG. 3 is a schematic block diagram of the circuitry incorporated into each valve monitoring device.

As shown in FIG. 3, which represents a preferred arrangement, the circuitry incorporated into the SIM 10 is provided with a microcontroller 30, such as Phillips 80CL 580. This particular microcontroller has integrated analog to digital (A/D) conversion capability, but a microcontroller without such capability may be used if separate A/D conversion is provided. Each of the sensors 12, 14, and 15 is connected to the microcontroller 30 through a signal conditioner 32, which amplifies and conditions the signals from their respective sensors for A/D conversion by the microcontroller 30, which signals are representative of the magnitude of the parameter being measured by each of the sensors 12, 14, and 15. A real time clock/calendar 34 is also connected to the microcontroller 30 to provide an accurate indication of the time the signals are generated by each of the sensors 12, 14, and 15. The input connections for each sensor also provide power to the respective sensors 12 and 15.

The digital signals so generated are correlated with the data from the clock/calendar 34 by the microcontroller 30 and stored in on-board random access memory (RAM) 36. The microcontroller 30 also converts the digital information into readable information for display on any suitable readout device, such as a liquid crystal display (LCD) 38, provided on the valve monitoring device 8. The microcontroller 30 will generate messages for display on the readout device which (i) indicate leakage flow through the pressure relief valve 13 has or is occurring, (ii) warn of unstable operation whenever the opening and closing of the closure element 16 in a given time interval exceeds a predetermined limit, which indicates that valve chatter has occurred, and (iii) indicate that the valve 13 has opened permitting escape of fluid from the system, the pressure at which it opened, the time at which it opened, and the length of time it was open, and may also calculate the mass or volume of fluid that escaped from the system through the valve 13. The microcontroller 30 may also be programmed to send correlated data to a host computer 19, as shown in FIG. 2, upon receipt of a command from the host computer 19.

Electric power may be provided to the SIM 10 by means of a battery (e.g., for stand alone applications), an external power source, or a 4–20 mA current loop powered from a process control network or similar source. The 4–20 mA connection also provides a convenient means for transmitting information to a direct connected network host computer. Communication between the SIM 10 and a host computer 19 (shown in FIG. 2) may be provided via a conventional RS-232 port or a modem 40 supporting commonly-used communication protocols, such as HART.

With reference again to FIG. 1, in some cases it is desirable to sense the difference in pressure between the inlet pressure system 18 and the pressure in the pressure line at the outlet 26 of the pressure relief valve 13. In such cases, a differential pressure sensor 24 is connected to the inlet pressure line 18 and the outlet pressure line 26 and the signal from the differential pressure sensor 24 is sent to the sensor input module 10 in addition to, or in lieu of, the signal sent from a pressure sensor 15 in the inlet pressure line 18. Alternatively, an outlet pressure sensor 23, which is similar to the pressure sensor 15, may be connected to the outlet 26 of the pressure relief valve 13. The signal generated by the sensor 23 is sent to the SIM 10 so that the microcontroller 30 can calculate the pressure difference.

Figure 2:
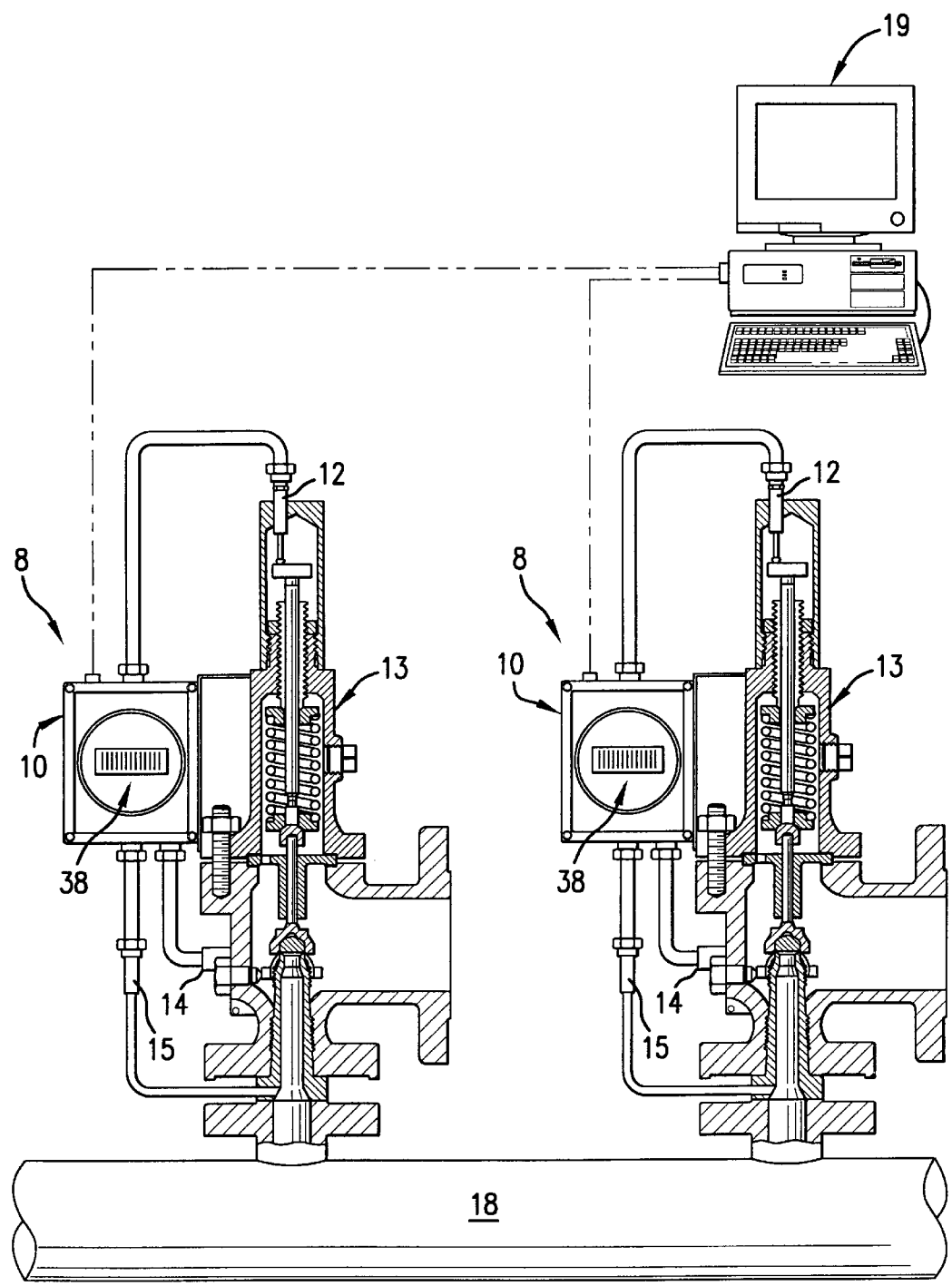
FIG. 2 is a view similar to FIG. 1, but showing two pressure relief valves with the valve monitoring devices connected to a host computer.

FIG. 2 shows two pressure relief valves 13 mounted on a pressure line 18, each with a valve monitoring device 8 in communication with a host computer 19, which arrangement is representative of what may be a plurality of valves, each of which may be mounted on separate and independent pressure lines. Communication between the host computer and each of the valve monitoring devices 8 may be provided by means of a permanent connection therebetween or by temporarily connecting the host computer to each of the valve monitoring devices 8 periodically for the purpose of data transfer. The host computer 19 may be arranged to extract stored data from each valve monitoring device 8 and utilize such data to determine present operating characteristics of the pressure relief valve 13, such as total flow through the pressure relief valve 13 during a specified time interval that the pressure relief valve 13 was open. When the valve monitoring device 8 is continuously connected to a host computer, a real time indication of lift or of the presence of leakage may be communicated as an alarm signal. The host computer 19 is arranged to analyze the information provided to it and to output information useful in determining the operational readiness of each valve, and may be used, when in constant communication with any particular valve monitoring device 8, to sound an alarm or otherwise indicate when the corresponding pressure relief valve 13 is leaking and/or open. The host computer 19 may also be used to receive, update, and store data such as valve configuration, maintenance history, or other useful information.

One of the advantages of the present invention is that it provides a monitoring device that continuously monitors the performance of the pressure relief valve while the valve is in active service, including detecting leakage flow through the pressure relief valve, calculating fluid mass flow through the pressure relief valve when the valve is open and allowing fluid to flow from the pressure line, and detecting and warning of unstable operation of the pressure relief valve. The monitoring device of the present invention may also communicate with a host computer to transmit the information stored by the monitoring device and receive information regarding that particular valve from the host computer. Of course, other objects and advantages of the present invention will become readily apparent to those skilled in this art from the above-recited detailed description. Accordingly, the drawings and descriptions are to be regarded as illustrative in nature, and not as restrictive.

We claim:

1. A method for monitoring the operation of a pressure relief valve having a closure element in sealing engagement with a nozzle for blocking flow of fluid through the pressure relief valve, the pressure relief valve being located proximate to a sensor input module, to a position sensor, and to a pressure sensor, said method comprising the steps of:

a. sensing the position of the closure element when the closure element moves relative to the nozzle and thus is no longer in sealing engagement with the nozzle and thus allows fluid to escape through the pressure relief valve;

b. generating a position signal representative of said position of the closure element;

c. recording said position signal as a function of time;

d. generating a pressure signal representative of the pressure of the fluid escaping through the pressure relief valve;

e. recording said pressure signal as a function of time; and f. correlating said recorded position signal with said recorded pressure signal to determine the quantity of fluid that has escaped through the pressure relief valve while the closure element has been out of sealing engagement with the nozzle.

2. The method according to claim 1, wherein the step of generating a pressure signal representative of the pressure of the fluid escaping through the pressure relief valve further comprises the step of:

sensing the inlet pressure of the fluid.

3. The method according to claim 1, wherein the step of generating a pressure signal representative of the pressure of the fluid escaping through the pressure relief valve further comprises the step of:

sensing the outlet pressure of the fluid.

4. The method according to claim 1, wherein the step of generating a pressure signal representative of the pressure of the fluid escaping through the pressure relief valve further comprises the step of:

sensing the differential pressure of the fluid.

5. An apparatus for monitoring the operation of a pressure relief valve having a closure element engageable with a nozzle to block flow of fluid through the pressure relief valve, comprising:
   a. a sensor input module including a microcontroller and a real time clock/calendar, said sensor input module located proximate to the pressure relief valve;
   b. a position sensor located proximate to the pressure relief valve and that indicates the position of the closure element relative to the nozzle by generating a lift signal representative of such position;
   c. said microcontroller configured to receive said lift signal and correlate the receipt thereof with an indication of time from said clock/calendar to determine the magnitude of movement of the closure element and the time of such movement; and
   d. wherein said microcontroller compares the frequency of said movement with a predetermined limit to detect unstable operation.

6. The invention according to claim 5 wherein said predetermined limit comprises a maximum limit and said microcontroller generates an indication of unstable operation when said maximum limit is exceeded.

7. An apparatus for monitoring the operation of a pressure relief valve having a closure element engageable with a nozzle to block flow of fluid through the pressure relief valve, comprising:
   a. a sensor input module including a microcontroller and a real time clock/calendar, said sensor input module located proximate to the pressure relief valve;
   b. a position sensor located proximate to the pressure relief valve and that indicates the position of the closure element relative to the nozzle by generating a lift signal representative of such position;
   c. a pressure sensor located proximate to the pressure relief valve that indicates pressure by generating a pressure signal representative of such pressure; and
   d. said microcontroller configured to receive said lift signal and correlate the receipt thereof with an indication of time from said clock/calendar to determine the magnitude of movement of the closure element and the time of such movement, and to receive said pressure signal and correlate the receipt thereof with an indication of time from said clock/calendar and with the magnitude of said pressure signal and the time at which said pressure signal changed.

8. The invention according to claim 7, wherein said microcontroller uses said pressure signal and said lift signal to calculate the amount of fluid that has flowed through the pressure relief valve.

9. The invention as recited in claim 7, wherein the pressure relief valve has an inlet and said pressure sensor measures the pressure at the inlet.

10. The invention according to claim 9, wherein said microcontroller uses said pressure signal and said lift signal to calculate the amount of fluid that has flowed through the pressure relief valve.

11. The invention as recited in claim 7, wherein the pressure relief valve has an outlet and said pressure sensor measures the pressure at the outlet.

12. The invention according to claim 11, wherein said microcontroller uses said pressure signal and said lift signal to calculate the amount of fluid that has flowed through the pressure relief valve.

13. The invention as recited in claim 7, wherein the pressure relief valve has an inlet and an outlet and said pressure sensor measures the difference in pressure between the inlet and the outlet.

14. The invention according to claim 13, wherein said microcontroller uses said pressure signal and said lift signal to calculate the amount of fluid that has flowed through the pressure relief valve.

15. A method for monitoring the operation of a pressure relief valve, the pressure relief valve having a closure element engageable with a nozzle to block the flow of fluid through the pressure relief valve, the pressure relief valve being located proximate to a sensor input module, said sensor input module having a microcontroller and a real time clock/calendar, said method comprising the steps of:
   a. sensing the position of the closure element relative to the nozzle using a position sensor located proximate to the pressure relief valve;
   b. generating a lift signal representative of said position;
   c. communicating said lift signal to said sensor input module;
   d. sensing pressure using a pressure sensor located proximate to the pressure relief valve;
   e. generating a pressure signal representative of such pressure;
   f. communicating said pressure signal to said sensor input module;
   g. generating an indication of time using said real time clock/calendar;
   h. determining the magnitude of movement of the closure element using said microcontroller and said lift signal;
   i. determining the time of said movement of the closure element;
   j. determining the magnitude of the pressure using said microcontroller and said pressure signal; and
   k. correlating the receipt of said pressure signal with said indication of time and with the magnitude of said pressure signal.

16. The method as recited in claim 15, further comprising the step of:

calculating the amount of fluid that has flowed through the pressure relief valve using said pressure signal, said lift signal, and said microcontroller.

17. The method as recited in claim 15, wherein the pressure relief valve has an inlet and the step of sensing pressure using a pressure sensor comprises sensing pressure at the inlet using said pressure sensor.

18. The method as recited in claim 17, further comprising the step of:

calculating the amount of fluid that has flowed through the pressure relief valve using said pressure signal, said lift signal, and said microcontroller.

19. The method as recited in claim 15, wherein the pressure relief valve has an outlet and the step of sensing pressure using a pressure sensor comprises sensing pressure at the outlet using said pressure sensor.

20. The method as recited in claim 19, further comprising the step of:

calculating the amount of fluid that has flowed through the pressure relief valve using said pressure signal, said lift signal, and said microcontroller.

21. The method as recited in claim 15, wherein the pressure relief valve has an inlet and an outlet and the step of sensing pressure using a pressure sensor comprises sensing the difference in pressure between the inlet and the outlet.

22. The method as recited in claim 21, further comprising the step of:

calculating the amount of fluid that has flowed through the pressure relief valve using said pressure signal, said lift signal, and said microcontroller.

23. A method for monitoring the operation of a pressure relief valve, the pressure relief valve having a closure element engageable with a nozzle to block the flow of fluid through the pressure relief valve, the pressure relief valve being located proximate to a sensor input module, said sensor input module having a microcontroller and a real time clock/calendar, said method comprising the steps of:

a. sensing the position of the closure element relative to the nozzle using a position sensor located proximate to the pressure relief valve;
b. generating a lift signal representative of said position;
c. communicating said lift signal to said sensor input module;
d. generating an indication of time using said real time clock/calendar;
e. determining the magnitude of movement of the closure element as a function of time by correlating the receipt of said lift signal with said indication of time using said microcontroller; and
f. comparing the frequency of said movement with a predetermined limit to detect unstable operation.

24. The method according to claim 23, wherein said predetermined limit comprises a maximum limit and further comprising the step of generating an indication of unstable operation when said maximum limit is exceeded.

* * * * *